Dec. 8, 1936.  H. A. FARRAND  2,063,423
COILABLE MEASURING DEVICE
Filed Oct. 17, 1932
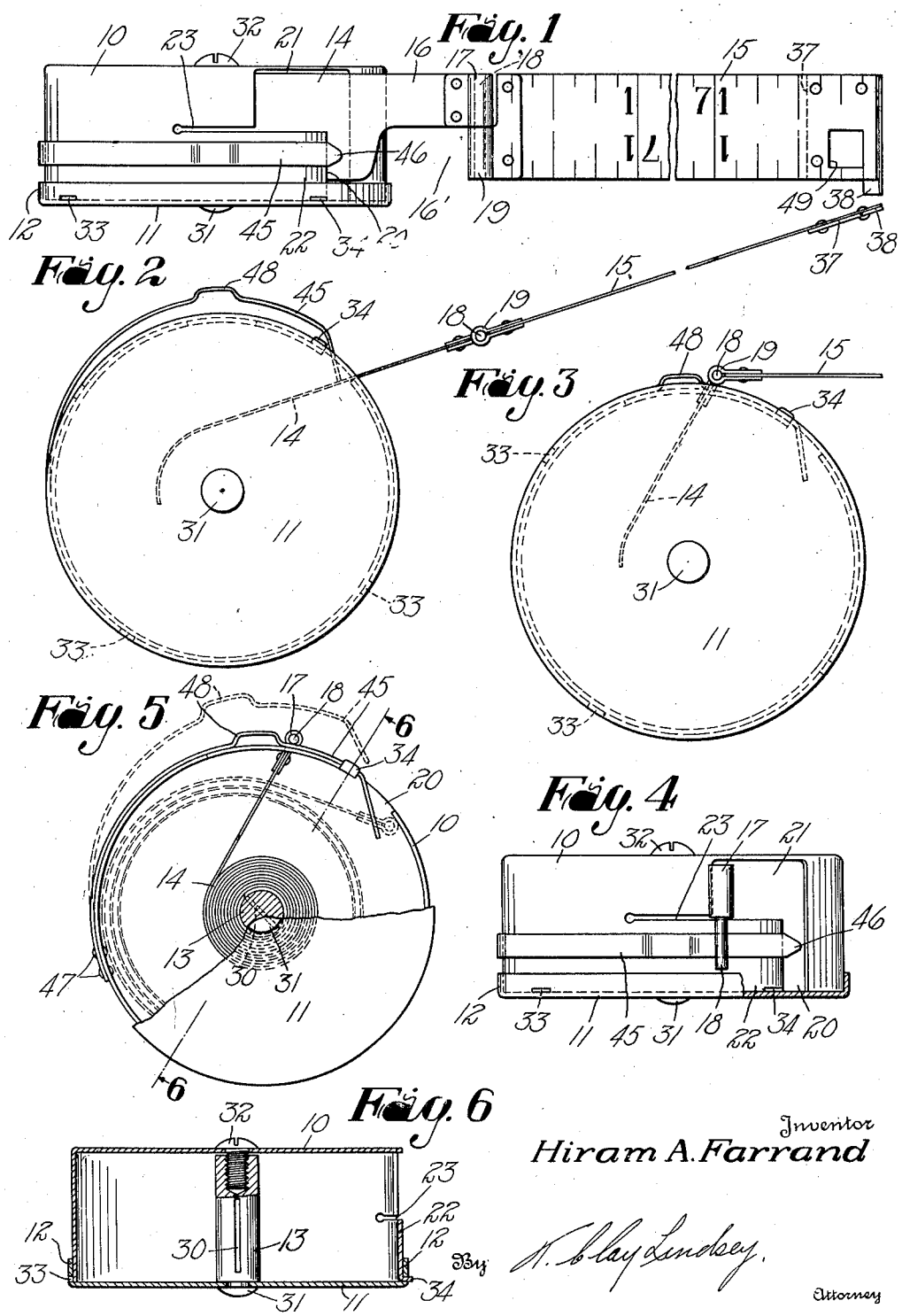
Inventor
Hiram A. Farrand
By N. Clay Lindsey
Attorney Patented Dec. 8, 1936

2,063,423

UNITED STATES PATENT OFFICE 2,063,423

COILABLE MEASURING DEVICE

Hiram A. Farrand, Berlin, N. H., assignor to Hiram A. Farrand, Inc., Berlin, N. H., a corporation of New Hampshire Application October 17, 1932, Serial No. 638,129

22 Claims. (Cl. 33—138)

My invention relates to coilable measuring devices such as flexible rules and measuring tapes and in particular to that type of winding devices in which the measuring strip is coiled and uncoiled from the outermost convolution. Furthermore, my invention is especially adaptable to that kind of measure which is resilient and is shaped transversely in a concavo-convex formation when resting in a longitudinally rectilinear state, which is a normal position for such a structure.

Coilable measuring devices prior to my invention, as disclosed in United States Letters Patent No. 1,402,589, were universally coiled by winding in successive convolutions around the exterior of a drum or other rotatable support, which was operated manually, as by means of a crank, or, automatically, by means of a spring tension. In a large number of cases with both such types, and particularly in the case of pocket measures, the measuring strip was permanently attached to the winding mechanism. But, under certain conditions—especially where very long tapes were employed (as for instance in the case of surveyor's tapes)—a detachable connection was provided and the measuring strip was commonly used, separate from its reel. It is to be noted, however, that in such cases the reel device was operable solely by hand power, and that in every instance where an automatic spring winding means was present, the measuring strip was permanently attached to the winding reel. The reason for such permanent connection was the necessity for preserving a certain relationship between the storage of energy, or spring tension, of the winding mechanism and the measuring strip which was coiled thereby. The loss of the proper relationship would render the device inoperative and under the conditions provided in the prior art, the recovery and reinstatement of such relationship was beyond the skill of the average rule user.

It is to be noted, however, that a measuring strip thus permanently attached to the means for winding, is deprived of a large measure of usefulness, since it will not serve for a number of purposes for which a rule having two free ends may serve.

Among the objects of my invention is to provide means whereby it is possible to employ a separable connection between the measuring strip and the winding means and to thus free the measuring strip for such purposes as may be impracticable when using a permanently attached strip. Among such purposes is the ability to abut either of the ends of the strip to an object when starting a measurement, and the correlated purpose of using the attached end as the zero mark of the measuring scale, and, when desired, of applying at least two separate measuring scales to such a strip, with the zero positions at opposite ends and reading in opposite directions; another purpose being to free the strip and thus facilitate the handling and permit its use through constricted passageways where the bulk of an attached winding device would obstruct progress.

Among the other objects of my invention is to provide simple means whereby the measuring strip may be detached with further provision to preserve against loss of the proper degree of stored spring energy which is necessary to rewind the measuring strip when it is restored to its attachment at the point of its connection with the winding mechanism. A further object is to provide facilities whereby should the proper relationship between the strip and the winding means suffer loss, the same may be restored by suitable means and as such adaptable to the skill of the average user of such an instrument.

Referring to the drawing:

Fig. 1 is a plan view of one form of the device made in accordance with the principles of my present invention;

Fig. 2 is a face view of the device shown in Fig. 1;

Fig. 3 is a face view similar to that shown in Fig. 2 but showing a slightly different position of the jointed connection between the measuring strip and its winding mechanism;

Fig. 4 is a plan view of the winding device shown in Figs. 1, 2, and 3 with the jointed connection at the position shown in Fig. 3 but with the measuring strip removed;

Fig. 5 is a face view of the winding mechanism shown in Fig. 4 with a portion of the cover broken away to exhibit the internal arrangement of parts; and Fig. 6 is a transverse sectional view through the casing, the same being taken substantially on the line 6—6 of Fig. 5.

Referring to the drawing, the device includes a casing, preferably of cylindrical form, and comprising a body portion or shell 10 and a cover 11, the latter having a marginal flange 12 fitting about the open end of the peripheral wall of the shell. Centrally located in the casing, as hereinafter described more in detail, is a stud or pin 13 to which one end of a resilient winding strip 14 is secured. Detachably secured to the outer or free end of the winding strip 14 is one end of a measuring strip or tape 15 which may be of flat or concavo-convex cross section, the latter being preferred. The outer end of the winding strip and the measuring tape are adapted to pass through a slot or opening in the peripheral wall of the shell and which opening will be described hereinafter more in detail.

In order to permit of ready detachment of the measuring tape from and attachment of the measuring tape to the outer end of the winding strip, a quick detachable connection is provided therebetween. In the present illustrative disclosure, the free end of the resilient winding strip is of reduced width so as to form a neck 16, to the outer end of which is secured a sleeve 17 which securely embraces a pin 18. The inner end of the measuring tape is provided with a similar sleeve 19 which is adapted to slip over the free end of the pin 18. When the parts are assembled, the sleeves are aligned and the combined lengths thereof are substantially equal to the width of the winding strip and tape. It is observed that the outer end of the winding strip is provided with a recess 16' and the projecting end of the pin 18 constitutes the forward edge of this recess. The word "recess", except where otherwise limited in the claims, is used in its broader sense to include a notch, a pocket, a hole or the like. The portion of the pin which projects from the sleeve 17 constitutes an abutment or head which, in the present instance, defines the front edge of the recess. This abutment is fixed with respect to the end of the winding strip.

For the purpose of preventing accidental withdrawal of the free end of the winding strip into the casing while the measuring strip is disconnected from the winding strip, the arrangement is such that the pin forming a part of the detachable connection may interlock with the casing. To this end, the opening in the casing is generally in the form of an L, it having a transverse slot portion 20 and a rearwardly extending notch or recess 21 leading rearwardly from one side of the slot. The slot 20 extends from the end wall of the shell to the flange of the cover and is of a width slightly greater than the width of the winding strip or measuring tape. The recess or notch 21 is of sufficient width to accommodate the narrow neck 16 of the winding strip. By providing a notch of this character, the casing is provided with a resilient tongue or section over which the free end of the pin 18 is adapted to extend, as shown in Fig. 4. If desired, the resiliency of this tongue may be increased by providing a slot 23 extending rearwardly from the rear edge of the recess 21.

The resilient winding strip 14 may be made of a spring material having an inherent tendency to uncoil. This strip may be in the form of a ribbon of metal, such as tempered steel with a normally flat cross section, or it may consist of a strip of similar steel further strengthened by means of forming it into a shape which is normally concavo-convex in cross section. While, in the present instance, the resilient strip is shown, by way of illustration, as being directly connected with the end of the measuring strip, it is to be understood that the usual rotatable drum or ring element may be interposed between the winding strip and the tape. The tension of the spring may be such as to automatically wind up the entire length of the winding strip or may be so adjusted as to simply overcome the friction of the several parts during an endwise pressure placed upon the extended portion of the measuring tape to force the latter into the casing. In the latter case, the friction may be depended upon to hold the working parts stationary at any point of extension at which the measuring strip may be carried, while the spring tension of the winding strip may be relied upon to take up the entering portion of the measuring strip and carry it forward into a coil, thus preventing it from binding on the interior wall of the casing, as it otherwise would.

For the purpose of adjusting the tension of the winding means, the pin or stud 13 (to which the inner end of the winding strip is anchored) is fixed to the cover 11 of the casing and provision is made for angularly adjusting this cover, together with the pin, with respect to the shell 10 while the outer end of the strip is anchored to that shell, as shown in Fig. 4. In the present illustrative disclosure, the inner end of the winding strip is passed through a slot 30 in the stud 13 and is then clinched. This stud has a small projection extending through an opening in the cover, this projection being headed as at 31 so as to prevent relative movement between the cover and the pin. The opposite end of the pin has a threaded recess which receives a screw 32 whereby the two parts of the casing are secured together against withdrawal. The cover is provided in its flange 12 with a plurality of angularly spaced apart openings or apertures 33 which are adapted to selectively receive a lug 34 extending radially from the free edge of the peripheral wall of the shell. In the present instance, this lug is formed at the extreme outer end of the resilient tongue 22. This tongue is sufficiently flexible and resilient to allow a slight movement inwardly under pressure so that it may be depressed to free the cover for rotation about the axis of the shell, or for removal therefrom.

With this arrangement, when it is desired to adjust the tension of the spring, the outer end of the strip is positioned as shown in Figs. 4 and 5 and in which position the narrow neck 16 of the strip lies in the recess 21 with the free end of the pin 18 extending over the tongue 22. The engagement of the pin on the tongue prevents the end of the strip from being drawn within the casing under the automatic tendency of the accumulated spring tension. The tongue 22 is now depressed so as to free the cover from the lug 34 and then the cover is rotated in the desired direction depending on whether greater tension or lesser tension is desired. When the cover is thus rotated, the stud rotates with it. The winding strip having been suitably regulated according to requirements, the cover is locked against further relative rotation with respect to the shell by engaging the lug 34 in the selected opening 33 of the cover. It may be observed also that the same regulation or adjustment may be effected whenever the measuring strip is wound into a coil along with the winding strip within the enclosure of the casing.

The outer or free end of the measuring strip or tape has secured to it, as by means of rivets, a plate 37 provided at one side with a laterally projecting lug 38 so that, at this point, the width of the plate is greater than the length of the slot 20, which means that, when the strip is fully wound up, the lug 38 will engage the flange 12 of the cover 11 and thus prevent the end of the rule slipping through the entrance slot and into the casing. Therefore, as long as the measuring strip is attached to the winding strip, there is no danger of the entire combination slipping into the enclosure and, when so wound, the lug 38 is always accessible.

It will be observed that, with the structure so far described, when it is desired to draw out the measuring tape, the exposed end thereof is grasped and pulled outwardly to the desired length. If it is desired to detach the measuring strip from the winding strip, the detachable connection formed by the sleeves 17 and 19 and the pin 18 is moved backward to the position shown in Fig. 3 and in which position the tongue 22 lies under that portion of the pin which is received by the sleeve 19. This sleeve may now be slipped from the pin by moving it laterally away from the winding strip, whereupon the measuring strip is free for independent use and the end of the winding strip is hooked over the tongue. Thus, a practical measure of security is provided against the entire length of the strip snapping back into the casing beyond reach for subsequent attachment to the measuring strip. When it is desired to re-connect the measuring strip to the winding strip, the sleeve 19 may be slipped on the pin and the strips will be drawn out slightly so as to bring the pin into registry with the slot 20, whereupon the pin may move through the slot and into the casing.

While the degree of security thus established against the automatic withdrawal of the winding strip into the casing is sufficient for all ordinary circumstances, it may be that, due to carelessness or some accidental disturbances, the outer end of the strip may be forced forwardly to a position beyond the protection of the tongue 22, whereupon it is likely to disappear into the casing and become inaccessible. Furthermore, under such conditions, the spring tension thus freed will be apt to act in a way to unwrap the convolutions of the winding strip and result in a loss of a portion of the requisite energy thereof. With my improved arrangement, it is quite possible to easily recover the free end of the winding strip and to regulate that strip to any desired degree of tension. This may be done by pressing downwardly on the tongue 22 so as to disengage the lug 34 from the opening 33 in which it has been positioned and, with the pressure maintained on the tongue, rotating the cover and the pin in a direction which would, if the outer end of the strip were anchored, wind up the strip, that direction in the present illustrative disclosure, referring to Fig. 5, being counterclockwise. Rotation of the cover is continued until the outer end of the winding strip comes opposite the slot 20 (as shown by dotted lines in Fig. 5) whereupon this end of the strip springs outwardly and moves forwardly to the full line position shown in Figs. 4 and 5, or it may be placed in that position manually. Whatever loss of tension has been sustained by reason of the accident may now be restored by continuing the rotation of the cover in the same direction. When the desired energy has been restored to the spring, pressure on the tongue 22 is relaxed so as to allow the lug 34 to repose in the nearest adjacent aperture or opening 33 in the cover. It is obvious that, should the strip be coiled too tightly, the tension thereof may be reduced by rotating the cover in the opposite direction, in the present instance, clockwise.

As a further measure of prevention against loss of the free end of the winding strip within the casing, and as an aid to the recovery of the free end of that strip in the event it should accidentally pass into the casing, I provide additional or supplemental means which comprises a light, transversely flat spring or tongue 45 extending circumferentially about the casing and having its free end pointed, as at 46. This free end of the spring is disposed at an angle and is adapted to extend down into the slot 20 forwardly of the tongue 22. The opposite end of the strip is firmly anchored to the peripheral wall of the shell, as by means of rivets 47. The spring, between its ends, is provided with a hump or offset portion 48 which constitutes means for lifting the spring in order to withdraw the pointed end thereof from the slot 20, as shown by broken lines in Fig. 5. As long as the winding strip or measuring tape is extending in a manner to lie beneath the free end of this spring, the point 46 rides in the elevated position shown by broken lines in Fig. 2, permitting movement of the strips in either direction. When the measuring strip is extended so that the neck 16 arrives opposite the pointed end of the spring 45, the point 46 snaps back into the opening behind the projecting portion of the pin 18 and thus locks the ingress of the jointed connection through the opening. Obviously, this spring constitutes additional means for diminishing the chances of accidental loss of the free end of the winding strip. It is also of assistance in recovering the free end of the strip should it accidentally pass into the casing. This is clearly shown by broken lines in Fig. 5. In order to accommodate the free end of the spring 45 when the measuring strip is fully coiled within the casing and thus allow the body of the spring to lie close to the periphery of the casing, the free end of this measuring strip is provided with a rectangular hole 49.

As stated, the measuring strip may be either in the form of a flat ribbon or a ribbon of concavo-convex cross section. However, to operate efficiently in the manner above described, where the tension of the winding strip is adjusted so as to take up the measuring strip into a coil while the latter is being pushed into the casing, it is preferable that the measuring strip be more or less of rigid formation. Such rigidity is best obtained by the use of the concavo-convex type of structure since that type readily sustains an endwise thrust without bending, whereas a flexible flat type would be apt to bend at any point along its extended portion.

The measuring strip is preferably provided with two scales, one starting with zero at one end while the other scale starts with zero at the other end. The two scales read in opposite directions. While these different scales are shown as imposed upon the same face of the measuring strip, it is obvious that the scales might easily be imposed on opposite faces, or that a number of scales may be arranged on both faces. With this arrangement, the user may unfasten the measuring strip and use either end thereof as a starting point. It may be said that a detached scale, such as shown in the drawing, is much handier to operate than one with but one single scale reading in but one direction. Also, by disconnecting the measuring strip from the winding mechanism, the measuring strip is much lighter and can be more easily and conveniently handled. The detached strip may be run through constricted passageways where the size of the casing would prohibit the use of a strip permanently connected to the winding mechanism.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a supporting structure having an entrance opening, a measuring strip adapted to be coiled within said supporting structure and moved through said opening, resilient means within said supporting structure for coiling said strip and having an end portion to which said measuring strip is connected in a readily detachable manner, said portion being adapted to be drawn through said opening and having a recess, and means on the supporting structure adjacent said opening for engaging in said recess.

2. In combination, a casing having an entrance opening, a measuring strip adapted to be coiled within said casing and moved through said opening, resilient means within said casing for coiling said strip and having an end portion provided with a fixed abutment to which said measuring strip is connected in a readily detachable manner, said portion being adapted to be drawn through said opening and having a recess behind said abutment, and means on the casing adjacent said opening for engaging in said recess.

3. In combination, a supporting structure having an entrance opening, a measuring strip adapted to be coiled within said supporting structure and moved through said opening, resilient means within said supporting structure for coiling said strip and having an end portion to which said measuring strip is connected in a readily detachable manner, said portion being adapted to be drawn through said opening and having a recess, and a tongue on the supporting structure adapted to engage in said recess of said end portion whereby to prevent accidental withdrawal of said end portion into the supporting structure.

4. In combination, a supporting structure having an entrance opening, a measuring strip adapted to be coiled within said supporting structure and moved through said opening, resilient means within said supporting structure for coiling said strip and having an outer end portion adapted to be drawn through said opening, a quick detachable connection between said end portion and measuring strip and including a transversely extending element carried by and immovable with respect to said end portion, and a tongue on said supporting structure adjacent said opening against which said element is adapted to engage whereby to prevent accidental withdrawal of the end portion into the supporting structure.

5. In combination, a casing having an entrance opening, a measuring strip adapted to be coiled within said casing and moved through said opening, resilient means within said casing for coiling said strip and having an outer end section adapted to be drawn through said opening, a quick detachable connection between said end section and measuring strip and including a head and a neck, said neck being of less transverse dimension than the head and located to the rear of said head, and means on said casing adjacent said opening and adapted to engage behind said head at the side of said neck to prevent accidental withdrawal of said outer end section when the measuring strip is separated therefrom.

6. In combination, a casing having an entrance opening, a measuring strip adapted to be coiled within said casing and moved through said opening, resilient means within said casing for coiling said strip and having an outer end portion of reduced width adapted to be drawn through said opening, a pin carried by said reduced portion and projecting laterally therefrom, a sleeve on said measuring strip adapted to be slipped onto the projecting end of said pin, and means on said casing adjacent said opening against which the projecting end of the pin is adapted to engage.

7. In combination, a casing having an entrance opening provided with a transversely extending slot portion and a recess portion extending from one side of said slot portion rearwardly with respect to the direction in which the measuring strip is withdrawn from said slot portion, said casing having a tongue rearwardly of the other side of said slot portion, a measuring strip adapted to be coiled within said casing and moved through said opening, and resilient means within said casing for coiling said strip and having an outer end portion adapted to be drawn through said opening, said end portion having a neck adapted to be received by said recess portion, there being a recess in said end portion at the side thereof and defining said neck and adapted to receive said tongue when said neck is engaged in said recess portion.

8. In combination, a casing having an entrance opening provided with a transversely extending slot portion and a recess portion extending from one side of said slot portion rearwardly with respect to the direction in which the measuring strip is withdrawn from said slot portion, said casing having a tongue rearwardly of the other side of said slot portion, a measuring strip adapted to be coiled within said casing and moved through said opening, resilient means within said casing for coiling said strip and having an outer end portion adapted to be drawn through said opening, said end portion having a neck adapted to be received by said recess portion, there being a recess in said end portion at the side thereof and defining said neck and adapted to receive said tongue when said neck is engaged in said recess portion, and a quick detachable connection between the outer end of said resilient means and one end of said measuring strip.

9. In combination, a casing having an entrance opening provided with a transversely extending slot portion and a recess portion extending from one side of said slot portion rearwardly with respect to the direction in which the measuring strip is withdrawn from said slot portion, said casing having a tongue rearwardly of the other side of said slot portion, a measuring strip adapted to be coiled within said casing and moved through said opening, resilient means within said casing for coiling said strip and having a neck portion at its outer end adapted to be drawn through said opening, a pin carried by said neck portion and projecting laterally therefrom, and means on one end of said measuring strip for detachably receiving the projecting end of said pin, said neck portion being receivable by said recess portion and said pin engaging the exterior surface of said tongue when said neck portion is engaged in said recess portion.

10. In combination, a casing having an entrance opening, a measuring strip adapted to be coiled within said casing and moved through said opening, resilient means within said casing for coiling said strip and having an end portion to which said measuring strip is connected in a readily detachable manner, said portion being adapted to be drawn through said opening and having a recess, and a spring on said casing having a free end projecting through said opening and adapted to engage in said recess.

11. In combination, a casing having an entrance opening, a measuring strip adapted to be coiled within said casing and moved through said opening, resilient means within said casing for coiling said strip and having an end portion to which said measuring strip is connected in a readily detachable manner, said portion being adapted to be drawn through said opening and having a recess, a tongue and a spring on said casing located at the rear edge of said opening and both adapted to engage in said recess of said end portion.

12. In combination, a casing having an entrance opening, a measuring strip adapted to be coiled within said casing and moved through said opening, resilient means within said casing for coiling said strip and having an outer end portion adapted to be drawn through said opening, a quick detachable connection between said end portion and measuring strip and including a transversely extending pin carried by said end portion, and a spring fixed at one end to said casing and having a free inturned end projecting through said opening and adapted to engage said pin.

13. In combination, a casing having an entrance opening provided with a transversely extending slot portion and a recess portion extending from one side of said slot portion rearwardly with respect to the direction in which the measuring strip is withdrawn from said slot portion, said casing having a tongue rearwardly of the other side of said slot portion, a measuring strip adapted to be coiled within said casing and moved through said opening, resilient means within said casing for coiling said strip and having an outer end portion adapted to be drawn through said opening, said end portion having a neck adapted to be received by said recess portion, there being a recess in said end portion to the side of said neck and adapted to receive said projection when said neck is engaged in said recess portion, and a spring secured at one end to said casing and having its free end overlying and extending beyond said tongue, the free end of said spring projecting through said opening and into said casing.

14. In combination, a supporting structure having an entrance opening, a measuring strip adapted to be coiled within said supporting structure and moved through said opening, a resilient strip coiled within said supporting structure and to which one end of said measuring strip is positively connected, an element within said supporting structure to which the inner end of said resilient strip is anchored, said element being rotatably adjustable with respect to said supporting structure, and means for securing said element in adjusted position and against rotation with respect to said supporting structure, said means serving to tension the resilient strip for retracting the measuring strip under the same initial tension each time it is withdrawn to the same extent from the casing.

15. In combination, a two-part casing, one of said parts having an entrance opening and the other of said parts being angularly adjustable with respect to the first part, interlocking means between said casing parts for detachably securing them together and against relative rotation, a pin secured to said second mentioned part so as to rotate therewith and be angularly adjustable relative to said entrance opening, a resilient winding strip coiled within said casing and having its inner end anchored to said pin, and a measuring strip positively connected to the outer end of said winding strip, the measuring strip being resiliently tensioned to the same predetermined but adjustable extent each time that said strip is completely withdrawn from the casing and without releasing any of the stored energy of the resilient strip as occasioned by adjustment of the casing parts.

16. In combination, a supporting structure having an entrance opening, a measuring strip adapted to be coiled within said structure and moved through said opening, a resilient strip coiled within said supporting structure and adapted to coilably retract the measuring strip into the structure, a detachable positive connection between said strips, an element within said supporting structure to which the inner end of said resilient strip is anchored, said element being rotatably adjustable with respect to said structure and the entrance opening for re-adjusting the tension of said resilient strip, and means to lock said element in adjusted position whereby an initial adjustment thereof will serve to successively exert the same predetermined retractable tension on the measuring strip each time that it is withdrawn to the same extent from the supporting structure.

17. In combination, a supporting structure, an entrance opening therein, a measuring strip adapted to pass through the opening and to be coiled within said supporting structure, a resilient member within said supporting structure for storing energy for use in coiling said measuring strip, an element to which the inner end of said resilient member is anchored, said element being rotatably adjustable to various predetermined fixed positions with respect to said supporting structure and to said entrance opening irrespective of the position of the measuring strip, a quick detachable connection between said measuring strip and resilient member, and means for securing the outer end of said resilient member against accidental withdrawal through the entrance opening into the supporting structure.

18. In combination, a casing member having an entrance opening in its peripheral wall, a measuring strip adapted to be coiled within said casing member and moved through said opening, a resilient member within said casing member for coiling said strip and having an outer end portion provided with a recess, a quick detachable connection between said outer end portion of the resilient member and said measuring strip, a tongue on the casing adapted to engage in said recess whereby to prevent accidental withdrawal of said end portion into the casing member, an element within said casing member to which the inner end of said resilient member is anchored, said element being rotatably adjustable with respect to said casing member, and means for securing said element in adjusted position against rotation with respect to said casing member.

19. In combination, a casing member having an entrance opening, a measuring strip adapted to be coiled within said casing member and moved through said opening, resilient means within said casing for coiling said strip and having an outer end portion adapted to be drawn through said opening, a quick detachable connection between said end portion and strip, said end portion having a recess, a spring on said casing member having a free end projecting through said opening and adapted to engage in said recess, and a pin within said casing member to which the inner end of said resilient means is anchored, said pin being rotatably adjustable with respect to said casing member.

20. In combination, a two-part casing having a shell member provided with a side wall and a peripheral wall and open at its other side, the peripheral wall of said shell member having an entrance opening, said casing having a cover member closing the open side of said shell member and provided with a flange encircling the marginal portion of said peripheral wall, a pin fixed to said cover, means cooperating with said pin for holding said members of said casing against axial withdrawal from one another, readily disengaging means for locking said cover member against rotation with respect to said shell member, a resilient strip coiled within said shell and having its inner end anchored to said pin, and a measuring strip positively connected to the outer end of said resilient strip.

21. In combination, a two-part casing, one of said parts having a peripheral wall and being open at one side, said peripheral wall having an entrance opening, the other of said parts being arranged to close the open side of said first mentioned part, one of said parts having a plurality of spaced openings and the other of said parts having a resilient portion provided with a lug adapted to selectively engage in said openings, said parts being relatively rotatable when said lug is disengaged from the openings, a pin carried by the second mentioned part, a winding strip having its inner end anchored to said pin, and a measuring strip positively connected to said winding strip and adapted to be drawn through said entrance opening.

22. In combination, a two-part casing including a shell member having a side wall and a peripheral wall, the other side of shell member being open, said peripheral wall having an entrance opening provided with a transversely extending slot portion and a recess portion extending from said slot portion rearwardly with respect to the direction in which the measuring strip is drawn through said opening, said shell member also having a tongue rearwardly of said slot portion and along side of said recess portion, said casing also including a cover member having a flange encircling the marginal portion of said peripheral wall, readily disengageable means for locking said cover member against rotation with respect to said shell member, a pin fixed to said cover member, a resilient strip coiled within said casing and having its inner end anchored to said pin, said resilient strip having an outer end having a neck adapted to be received by said recess portion, there being a recess in said end portion at the side thereof and defining said neck and adapted to receive said tongue when said neck is engaged in said recess portion, and a measuring strip detachably connected to the outer end of said resilient strip.

HIRAM A. FARRAND.